(12) United States Patent
Lin et al.

(10) Patent No.: US 12,538,443 B2
(45) Date of Patent: Jan. 27, 2026

(54) ELECTRONIC DEVICE INCLUDING TRANSMISSION STRUCTURE AND STYLUS

(71) Applicant: VIVO MOBILE COMMUNICATION CO., LTD., Dongguan (CN)

(72) Inventors: Hanzhong Lin, Dongguan (CN); Liguo Zhang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 166 days.

(21) Appl. No.: 18/400,086

(22) Filed: Dec. 29, 2023

(65) Prior Publication Data

US 2024/0138081 A1    Apr. 25, 2024
US 2024/0237244 A9    Jul. 11, 2024

Related U.S. Application Data

(63) Continuation of application No. PCT/CN2022/102487, filed on Jun. 29, 2022.

(30) Foreign Application Priority Data

Jul. 2, 2021    (CN) .......................... 202110755128.9

(51) Int. Cl.
*H05K 5/00*     (2025.01)
*G06F 1/16*     (2006.01)
(Continued)

(52) U.S. Cl.
CPC ......... *H05K 5/0226* (2013.01); *G06F 1/1652* (2013.01); *G06F 1/1681* (2013.01); *G06F 3/03545* (2013.01); *H05K 5/0018* (2022.08)

(58) Field of Classification Search
CPC .. H05K 5/0226; H05K 5/0018; H05K 5/0217; H05K 5/0017; G06F 1/1652; G06F 1/1681; G06F 1/16; G06F 1/1641
See application file for complete search history.

(56) References Cited

U.S. PATENT DOCUMENTS 5,796,575 A    8/1998   Podwalny et al.
6,398,027 B1 *   6/2002   Ryu ..................... A45C 11/008
                                                                                               206/362
(Continued)

FOREIGN PATENT DOCUMENTS

CN           2549516 Y     5/2003
CN         108170213 A     6/2018
(Continued)

*Primary Examiner* — Abhishek M Rathod
(74) *Attorney, Agent, or Firm* — The Webb Law Firm

(57) ABSTRACT

An electronic device includes a flexible screen, a first housing, a second housing, a stylus, and a transmission structure. The flexible screen is connected to the first housing and the second housing, the transmission structure is arranged on the first housing, and the stylus is connected to the transmission structure; in a case that the flexible screen is driven to fold by the first housing and the second housing, the transmission structure drives the stylus to approach the flexible screen, to accommodate the stylus in a gap formed after the flexible screen is folded; and in a case that the flexible screen is driven to unfold by the first housing and the second housing, the transmission structure drives the stylus to move away from the flexible screen, to cause the stylus and the flexible screen to form a preset included angle.

11 Claims, 7 Drawing Sheets

(51) Int. Cl.
*G06F 3/0354* (2013.01)
*H05K 5/02* (2006.01)

(56) References Cited

U.S. PATENT DOCUMENTS

| | | | |
|---|---|---|---|
| 6,577,496 B1 | 6/2003 | Gioscia et al. | |
| 8,897,005 B2 * | 11/2014 | Huang | H05K 7/16 |
| | | | 361/679.01 |
| 9,395,753 B2 * | 7/2016 | Amano | B65D 25/005 |
| 10,031,557 B1 * | 7/2018 | Morrison | G06F 1/189 |
| 2008/0123286 A1 | 5/2008 | Watanabe et al. | |
| 2011/0102979 A1 * | 5/2011 | Jinkinson | G06F 1/1616 |
| | | | 361/679.01 |
| 2013/0225001 A1 * | 8/2013 | Chang | G06F 1/166 |
| | | | 439/625 |

FOREIGN PATENT DOCUMENTS

| | | |
|---|---|---|
| CN | 108363458 A | 8/2018 |
| CN | 109889636 A | 6/2019 |
| CN | 209593500 U | 11/2019 |
| CN | 210052079 U | 2/2020 |
| CN | 111327739 A | 6/2020 |
| CN | 211702091 U | 10/2020 |
| CN | 211702093 U | 10/2020 |
| CN | 112311916 A | 2/2021 |
| CN | 212461008 U | 2/2021 |
| CN | 212724536 U | 3/2021 |
| CN | 112924799 A | 6/2021 |
| CN | 112995367 A | 6/2021 |
| CN | 113490353 A | 10/2021 |
| KR | 10-2008-0050308 A | 6/2008 |
| TW | M601367 U | 9/2020 |
| WO | 2021075726 A1 | 4/2021 |

\* cited by examiner

ELECTRONIC DEVICE INCLUDING TRANSMISSION STRUCTURE AND STYLUS

CROSS-REFERENCE TO RELATED APPLICATIONS

This application is a Bypass Continuation Application of International Patent Application No, PCT/CN2022/102487 filed Jun. 29, 2022, and claims priority to Chinese Patent Application No. 202110755128.9 filed Jul. 2, 2021, the disclosures of which are hereby incorporated by reference in their entireties.

BACKGROUND OF THE INVENTION

Field of the Invention

This application relates to the technical field of electronic devices, and specifically, to an electronic device.

Description of Related Art

With the advancement of science and technology, an electronic device has increasingly full functions. Generally, the electronic device includes a flexible screen and a housing, where the flexible screen is arranged on the housing, and the flexible screen may be driven to fold or unfold by the housing. However, a user can hardly arrange a stylus on the electronic device, and consequently, it is inconvenient for the user to operate the electronic device.

SUMMARY OF THE INVENTION

An embodiment of this application provides an electronic device, including: a flexible screen, a first housing, a second housing, a stylus, and a transmission structure, where the first housing is movably connected to the second housing, the flexible screen is connected to the first housing and the second housing, the transmission structure is arranged on the first housing, and the stylus is connected to the transmission structure;

in a case that the flexible screen is driven to fold by the first housing and the second housing, the transmission structure drives the stylus to approach the flexible screen, to accommodate the stylus in a gap formed after the flexible screen is folded; and in a case that the flexible screen is driven to unfold by the first housing and the second housing, the transmission structure drives the stylus to move away from the flexible screen, to cause the stylus and the flexible screen to form a preset included angle.

REFERENCE NUMERALS

Figure 1:
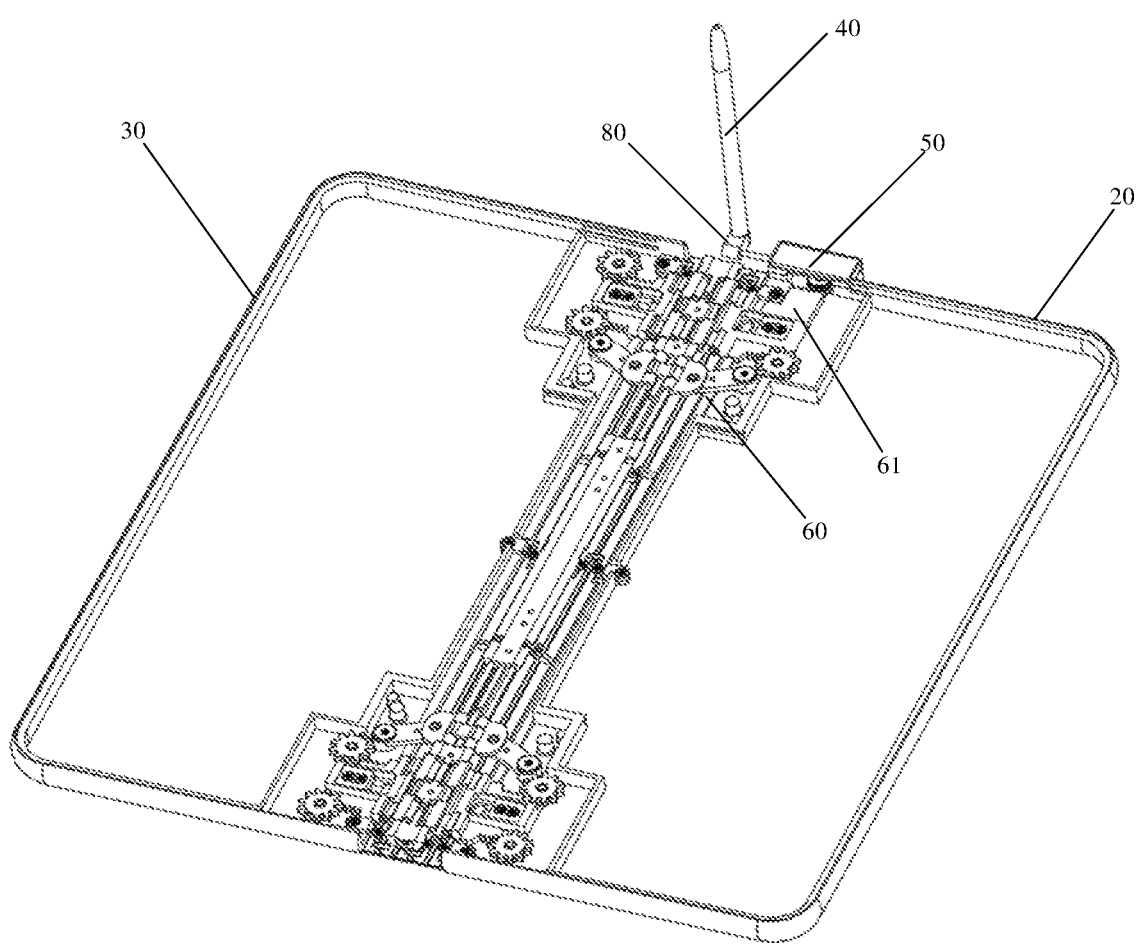
FIG. 1 is a first schematic diagram of an electronic device in an unfolded state according to an embodiment of this application.

10: Flexible screen; 20: First housing; 30: Second housing; 40: Stylus; 50: Transmission structure; 60: Hinge component; 70: Support; 80: Mounting base; 21: Rotation shaft; 51: Transmission rod; 52: Transmission gear assembly; 61: Sliding block; 71: Fixing block; 72: Fixing plate; 81: Mounting groove; 511: First transmission insection; 521: Driving gear; 522: Driven gear; 611: Second transmission insection; and 701: Rotation groove.

DESCRIPTION OF THE INVENTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application shall fall within the protection scope of this application.

Therefore, a feature limited by the term "first" or "second" in the specification and claims of this application may explicitly or implicitly include one or more of the features. In descriptions of the present invention, unless otherwise stated, "a plurality of" means two or more. In addition, in the specification and claims, "and/or" indicates at least one of associated objects, and the character "/" generally indicates an "or" relationship between the associated objects.

In the description of the present invention, it should be noted that, unless otherwise explicitly specified and defined, the terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand specific meanings of the foregoing terms in the present invention according to a specific situation.

It should be understood that, "one embodiment" or "an embodiment" mentioned throughout the specification indicates that a particular feature, structure, or characteristic that is related to the embodiment is included in at least one embodiment of this application. Therefore, "in one embodiment" or "in an embodiment" that appears throughout the entire specification does not necessarily mean a same embodiment. In addition, the particular feature, structure, or characteristic may be combined in one or more embodiments in any proper manner. That is to say, different optimization features in different embodiments can be combined to form other embodiments as long as they are not contradictory.

As shown in FIG. 1 to FIG. 7, an electronic device includes: a flexible screen 10, a first housing 20, a second housing 30, a stylus 40, and a transmission structure 50.

The first housing 20 is movably connected to the second housing 30, the flexible screen 10 is connected to the first housing 20 and the second housing 30, the transmission structure 50 is arranged on the first housing 20, and the stylus 40 is connected to the transmission structure 50. In a case that the flexible screen 10 is driven to fold by the first housing 20 and the second housing 30, the transmission structure 50 drives the stylus 40 to approach the flexible screen 10, to accommodate the stylus 40 in a gap formed after the flexible screen 10 is folded; and in a case that the flexible screen 10 is driven to unfold by the first housing 20 and the second housing 30, the transmission structure 50 drives the stylus 40 to move away from the flexible screen 10, to cause the stylus 40 and the flexible screen 10 to form a preset included angle.

In the embodiments of this application, the first housing 20 is movably connected to the second housing 30, and the flexible screen 10 is connected to the first housing 20 and the second housing 30, so that when the first housing 20 and the second housing 30 move relative to each other, the flexible screen 10 may be driven to fold or unfold by the first housing 20 and the second housing 30. The transmission structure 50 is arranged on the first housing 20, and the stylus 40 is connected to the transmission structure 50, so that the transmission structure 50 may transmit power to the stylus 40, to cause the stylus 40 to move. For example, when the flexible screen 10 is driven to fold by the first housing 20 and the second housing 30, the transmission structure 50 drives the stylus 40 to approach the flexible screen 10, to accommodate the stylus 40 in the gap formed after the flexible screen 10 is folded; and when the flexible screen 10 is driven to unfold by the first housing 20 and the second housing 30, the transmission structure 50 drives the stylus 40 to move away from the flexible screen 10, to cause the stylus 40 and the flexible screen 10 to form the preset included angle. That is, by arranging the transmission structure 50 and connecting the stylus 40 to the transmission structure 50, when the flexible screen 10 is folded, the stylus 40 may be accommodated in the gap formed after the flexible screen 10 is folded, and when the flexible screen 10 is unfolded, the stylus 40 and the flexible screen 10 form the preset included angle. This helps arrangement of the stylus 40 on the electronic device, also helps accommodation of the stylus 40, and helps use of the stylus 40 by a user to operate the electronic device when the flexible screen 10 is unfolded.

It should be noted that, in the embodiments of this application, the flexible screen 10 is bonded to the first housing 20 and the second housing 30 in a bonding manner, so that the flexible screen 10 is connected to the first housing 20 and the second housing 30. A mounting sinking platform may be arranged on both the first housing 20 and the second housing 30, and the flexible screen 10 is bonded to the mounting sinking platform of the first housing 20 and the mounting sinking platform of the second housing 30, so that the flexible screen 10 is flush with a surface of the first housing 20 and a surface of the second housing 30. In addition, the first housing 20 may include a first middle frame and a first rear cover, where the first rear cover is connected to a first side of the first middle frame, the flexible screen 10 is connected to a second side of the first middle frame, and the first side is opposite to the second side. Similarly, the second housing 30 may also include a second middle frame and a second rear cover, where the second rear cover is connected to a side of the second middle frame, and the flexible screen 10 is connected to another side of the second middle frame. Certainly, the first housing 20 and the second housing 30 may both be an integrally formed housing. Therefore, this is not limited in the embodiments of this application.

In addition, in the embodiments of this application, the preset included angle may be set according to an actual requirement. For example, the preset included angle is 90 degrees, that is, after the flexible screen 10 is unfolded, the stylus 40 is perpendicular to the flexible screen 10. In another example, the preset included angle may be 60 degrees, 120 degrees, or 180 degrees, and a specific value of the preset angle is not limited in the embodiments of this application.

Figure 4:
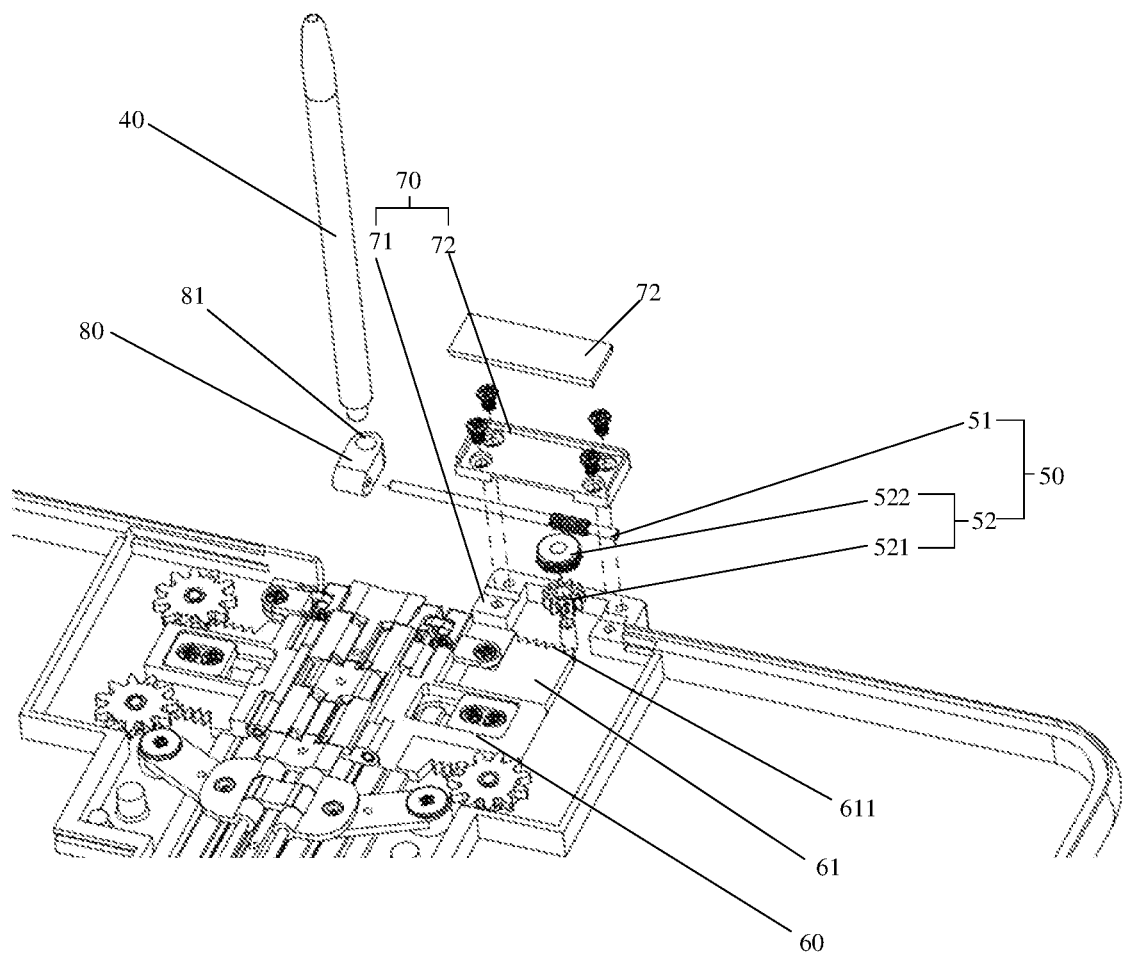
FIG. 4 is a first partial exploded view of an electronic device according to an embodiment of this application.
Figure 5:
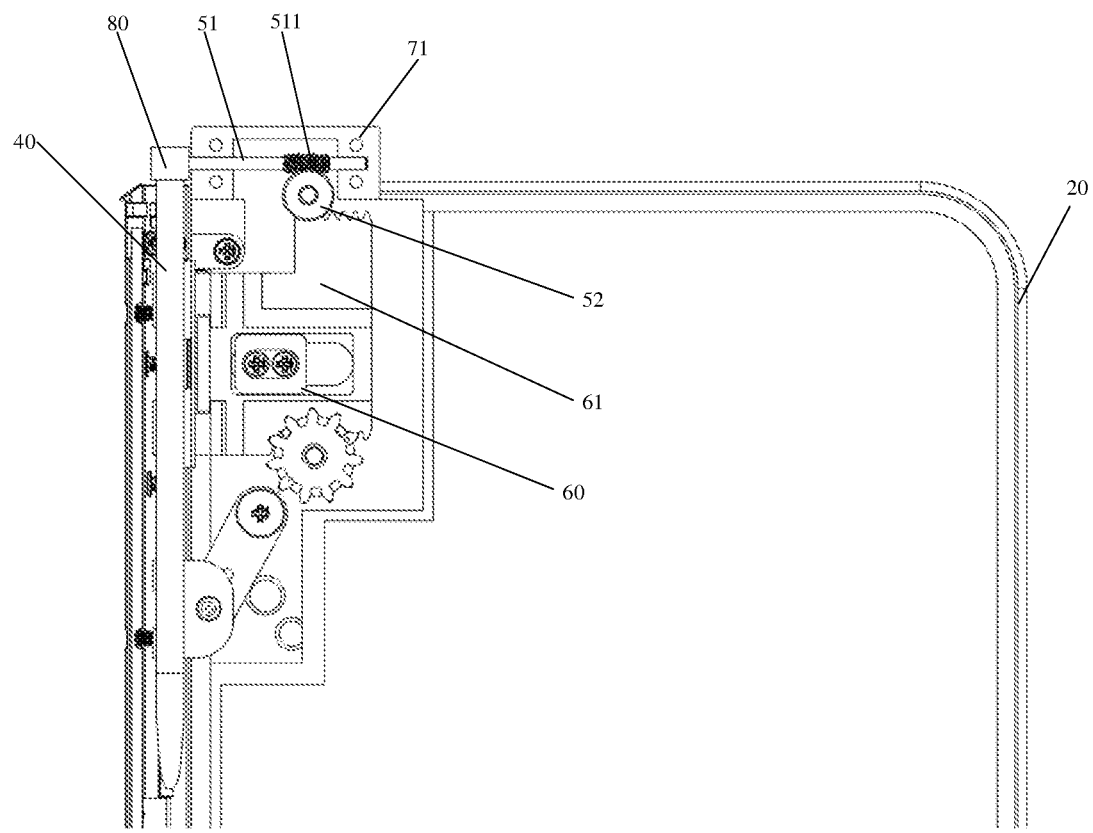
FIG. 5 is a schematic diagram of an electronic device in a folded state according to an embodiment of this application.

In addition, in some embodiments, as shown in FIG. 4, the transmission structure 50 may include a transmission rod 51 and a transmission gear assembly 52. The transmission gear assembly 52 is rotatably connected to the first housing 20, a first transmission insection 511 is provided on the transmission rod 51, the transmission gear assembly 52 is engaged with the first transmission insection 511, and the transmission rod 51 is connected to the stylus 40. In a case that the flexible screen 10 is driven to fold by the first housing 20 and the second housing 30, the transmission gear assembly 52 rotates along a first direction to cause the transmission rod 51 to rotate along a first rotation direction, and the transmission rod 51 drives the stylus 40 to approach the flexible screen 10; and in a case that the flexible screen 10 is driven to unfold by the first housing 20 and the second housing 30, the transmission gear assembly 52 rotates along a second direction to cause the transmission rod 51 to rotate along a second rotation direction, and the transmission rod 51 drives the stylus 40 to move away from the flexible screen 10. The first direction and the second direction are reverse, and the first rotation direction and the second rotation direction are reverse.

The transmission gear assembly 52 is rotatably connected to the first housing 20, so that the transmission gear assembly 52 may rotate relative to the first housing 20. The first transmission insection 511 is provided on the transmission rod 51, and the transmission gear assembly 52 is engaged with the first transmission insection 511, so that when the transmission gear assembly 52 rotates, the transmission gear assembly 52 drives the transmission rod 51 to rotate. The transmission rod 51 is connected to the stylus 40, so that when the transmission rod 51 rotates, the transmission rod 51 may drive the stylus 40 to move, so that the stylus 40 approaches or moves away from the flexible screen 10. For example, when the flexible screen 10 is driven to fold by the first housing 20 and the second housing 30, the transmission gear assembly 52 rotates along the first direction, the transmission rod 51 is caused to rotate along the first rotation direction, and the transmission rod 51 then drives the stylus 40 to approach the flexible screen 10, so that the stylus 40 may be accommodated in the gap formed after the flexible screen 10 is folded; and when the flexible screen 10 is driven to unfold by the first housing 20 and the second housing 30, the transmission gear assembly 52 rotates along the second direction, the transmission rod 51 is caused to rotate along the second rotation direction, and the transmission rod 51 then drives the stylus 40 to move away from the flexible screen 10, so that the stylus 40 and the flexible screen 10 form the preset included angle.

In addition, in the embodiments of this application, as shown in FIG. 4, the transmission gear assembly 52 may include a driving gear 521 and a driven gear 522. A rotation shaft 21 is arranged on the first housing 20, the driving gear 521 and the driven gear 522 are both sleeved on the rotation shaft 21, the driving gear 521 is connected to the driven gear 522, and the driven gear 522 is engaged with the first transmission insection 511.

The rotation shaft is arranged on the first housing 20, and the driving gear 521 and the driven gear 522 are both sleeved on the rotation shaft 21, so that the driving gear 521 and the driven gear 522 may both rotate around the rotation shaft 21, that is, the driving gear 521 and the driven gear 522 may rotate coaxially. The driving gear 521 is connected to the driven gear 522, and the driven gear 522 is engaged with the first transmission insection 511, so that after the driving gear 521 rotates, the driving gear 521 may drive the driven gear 522 to rotate, and the driven gear 522 is caused to drive the transmission rod 51 to rotate. In the embodiments of this application, using the driven gear 522 to drive the transmission rod 51 to rotate is equivalent to using the principle of a worm wheel and a worm, where the driven gear 522 is equivalent to a worm wheel, and the transmission rod 51 is equivalent to a worm, and using the driven gear 522 to drive the transmission rod 51 to rotate is equivalent to using the worm wheel to drive the worm to rotate, so that power is transmitted to the stylus 40, and the stylus 40 may rotate as the transmission rod 51 rotates.

Figure 2:
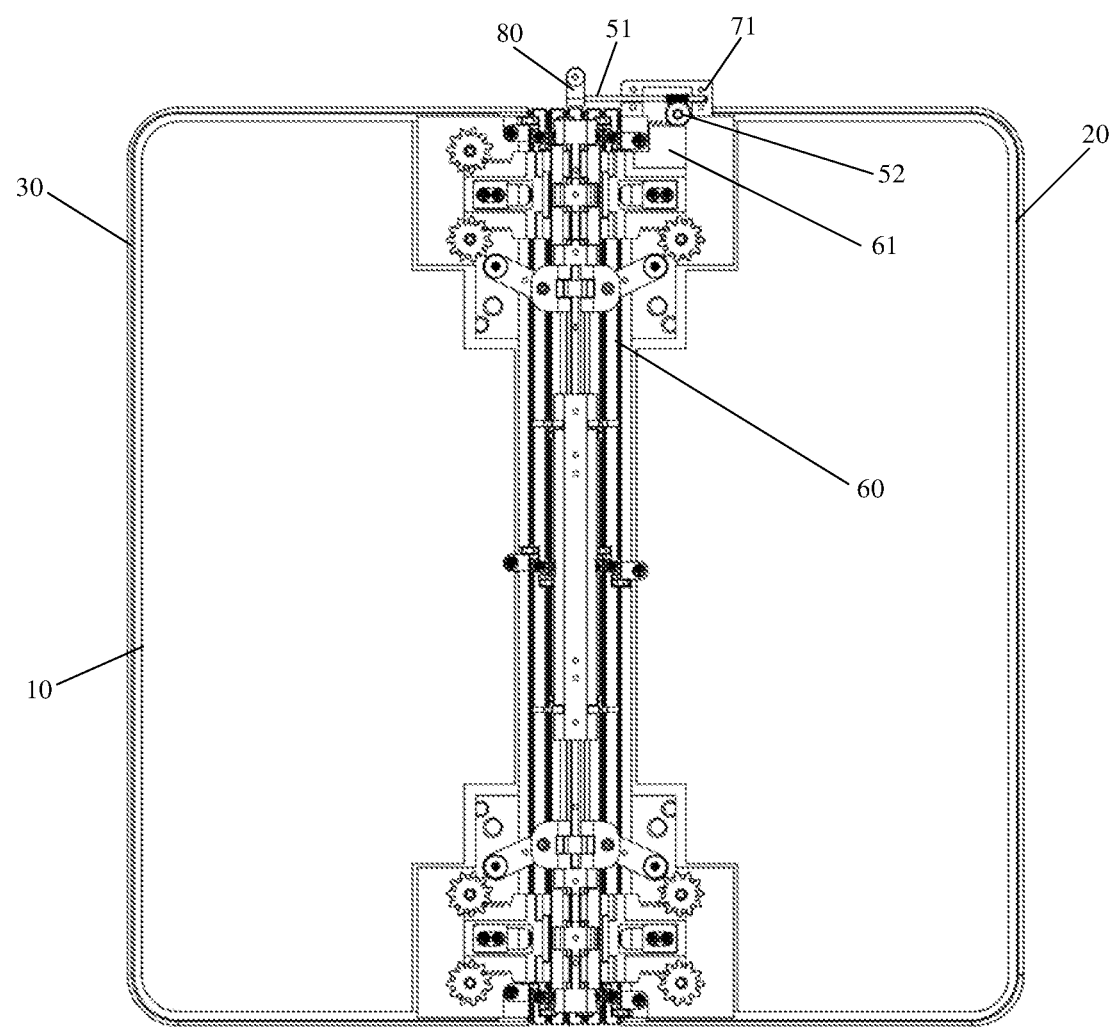
FIG. 2 is a second schematic diagram of an electronic device in an unfolded state according to an embodiment of this application.
Figure 3:
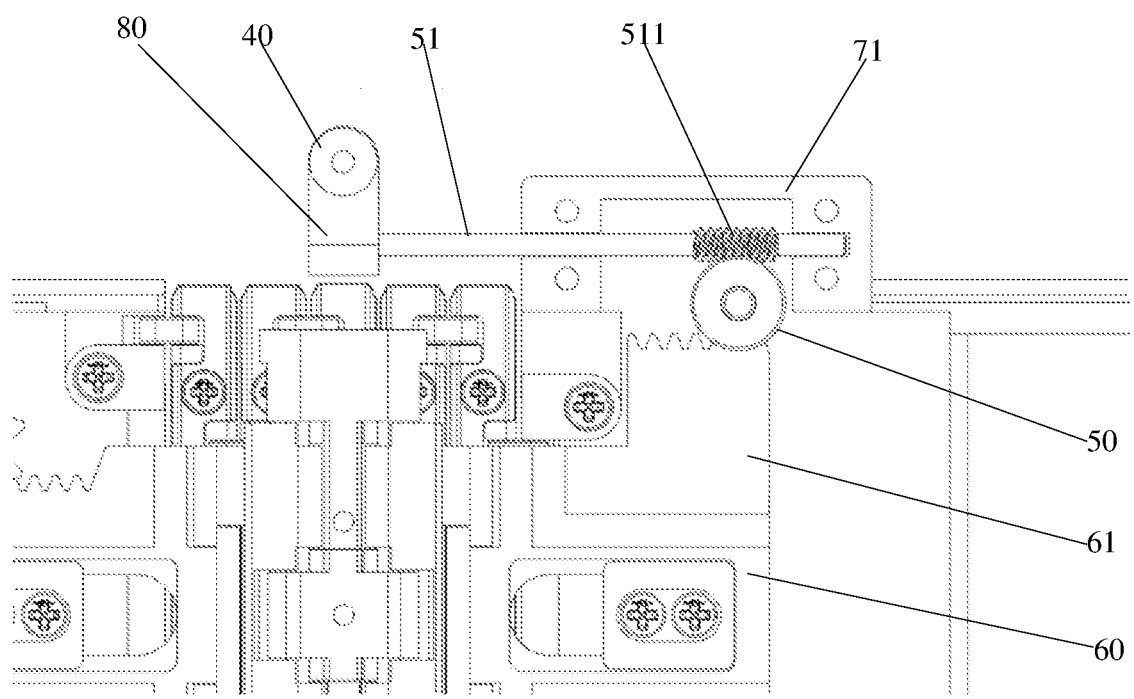
FIG. 3 is a third schematic diagram of an electronic device in an unfolded state according to an embodiment of this application.

In addition, in the embodiments of this application, the transmission gear assembly 52 may be driven in different manners to cause the transmission gear assembly 52 to rotate, and details are described by using the following manners as examples:

(1) As shown in FIG. 2, the first housing 20 is connected to the second housing 30 through a hinge component 60. The hinge component 60 is connected to the transmission gear assembly 52. In a case that the flexible screen 10 is driven to fold by the first housing 20 and the second housing 30, the hinge component 60 drives the transmission gear assembly 52 to rotate along the first direction; and in a case that the flexible screen 10 is driven to unfold by the first housing 20 and the second housing 30, the hinge component 60 drives the transmission gear assembly 52 to rotate along the second direction.

The first housing 20 is connected to the second housing 30 through the hinge component 60, so that the first housing 20 and the second housing 30 may move relative to each other. That is, the first housing 20 and the second housing 30 may approach or move away from each other, so that the flexible screen 10 is driven to fold or unfold by the first housing 20 and the second housing 30. The hinge component 60 is connected to the transmission gear assembly 52, so that when the flexible screen 10 is driven to fold by the first housing 20 and the second housing 30, the hinge component 60 may drive the transmission gear assembly 52 to rotate along the first direction, the transmission gear assembly 52 may be caused to drive the transmission rod 51 to rotate along the first rotation direction, and the transmission rod 51 then drives the stylus 40 to approach the flexible screen 10, so that the stylus 40 may be accommodated in the gap formed after the flexible screen 10 is folded; and when the flexible screen 10 is driven to unfold by the first housing 20 and the second housing 30, the hinge component 60 may drive the transmission gear assembly 52 to rotate along the second direction, the transmission gear assembly 52 may be caused to drive the transmission rod 51 to rotate along the second rotation direction, and the transmission rod 51 then drives the stylus 40 to move away from the flexible screen 10, so that the stylus 40 and the flexible screen 10 form the preset included angle.

It should be noted that, when the transmission gear assembly 52 includes the driving gear 521 and the driven gear 522, the hinge component 60 may drive the driving gear 521 to rotate, and the driving gear 521 is caused to drive the driven gear 522 to rotate, so that the driven gear 522 drives the transmission rod 51 to rotate to drive the stylus 40 to move.

In addition, in the embodiments of this application, a connection manner of the hinge component 60 and the transmission gear assembly 52 may be that: the hinge component 60 is connected to a sliding block 61, a second transmission insection 611 is provided on the sliding block 61, and the second transmission insection 611 is engaged with the transmission gear assembly 52. In a case that the flexible screen 10 is driven to fold by the first housing 20 and the second housing 30, the hinge component 60 drives the sliding block 61 to slide along a first sliding direction, to cause the sliding block 61 to drive the transmission gear assembly 52 to rotate along the first direction; and in a case that the flexible screen 10 is driven to unfold by the first housing 20 and the second housing 30, the hinge component 60 drives the sliding block 61 to slide along a second sliding direction, to cause the sliding block 61 to drive the transmission gear assembly 52 to rotate along the second direction. The first sliding direction and the second sliding direction are reverse.

The hinge component 60 is connected to the sliding block 61, the second transmission insection 611 is provided on the sliding block 61, and the second transmission insection 611 is engaged with the transmission gear assembly 52. Therefore, when the flexible screen 10 is driven to fold or unfold by the first housing 20 and the second housing 30, the hinge component 60 may drive the sliding block 61 to move, and in a moving process of the sliding block 61, the sliding block 61 drives the transmission gear assembly 52 to rotate, so that the transmission gear assembly 52 drives the transmission rod 51 to rotate. For example, when the flexible screen 10 is driven to fold by the first housing 20 and the second housing 30, the hinge component 60 may drive the sliding block 61 to slide along the first sliding direction. In this case, the sliding block 61 drives the transmission gear assembly 52 to rotate along the first direction, the transmission gear assembly 52 drives the transmission rod 51 to rotate along the first rotation direction, and the stylus 40 is caused to approach the flexible screen 10, so that the stylus 40 may be finally accommodated in the gap formed after the flexible screen 10 is folded. When the flexible screen 10 is driven to unfold by the first housing 20 and the second housing 30, the hinge component 60 may drive the sliding block 61 to slide along the second sliding direction. In this case, the sliding block 61 drives the transmission gear assembly 52 to rotate along the second direction, the transmission gear assembly 52 drives the transmission rod 51 to rotate along the second rotation direction, and the stylus 40 is caused to move away from the flexible screen 10, so that the stylus 40 and the flexible screen 10 finally form the preset included angle.

It should be noted that, when the transmission gear assembly 52 includes the driving gear 521 and the driven gear 522, the second transmission insection 611 on the sliding block 61 may be engaged with the driving gear 521, so that when the hinge component 60 drives the sliding block 61 to move, the sliding block 61 may drive the driving gear 521 to rotate, the driving gear 521 further drives the driven gear 522 to rotate, and the driven gear 522 drives the transmission rod 51 to rotate to drive the stylus 40 to move.

(2) A driving assembly (not shown in the figure) is arranged in the first housing 20. The driving assembly is connected to the transmission gear assembly 52. In a case that the flexible screen 10 is driven to fold by the first housing 20 and the second housing 30, the driving assembly drives the transmission gear assembly 52 to rotate along the first direction; and in a case that the flexible screen 10 is driven to unfold by the first housing 20 and the second housing 30, the driving assembly drives the transmission gear assembly 52 to rotate along the second direction.

The driving assembly is connected to the transmission gear assembly 52, so that the driving assembly may drive the transmission gear assembly 52 to rotate, the transmission gear assembly 52 may be caused to drive the transmission rod 51 to rotate, and the transmission rod 51 further drives the stylus 40 to move. For example, when the flexible screen 10 is driven to fold by the first housing 20 and the second housing 30, the driving assembly may drive the transmission gear assembly 52 to rotate along the first direction, the transmission gear assembly 52 drives the transmission rod 51 to rotate along the first rotation direction, and the transmission rod 51 drives the stylus 40 to approach the flexible screen 10. When the flexible screen 10 is driven to unfold by the first housing 20 and the second housing 30, the driving assembly may drive the transmission gear assembly 52 to rotate along the second direction, the transmission gear assembly 52 drives the transmission rod 51 to rotate along the second rotation direction, and the transmission rod 51 drives the stylus 40 to move away from the flexible screen 10.

It should be noted that, a control circuit and a sensor may be arranged in the electronic device, where the sensor is electrically connected to the control circuit, and the control circuit is electrically connected to the driving assembly. The sensor may detect that the flexible screen 10 is driven to fold or unfold by the first housing 20 and the second housing 30, and send detected information to the control circuit, and the control circuit controls the driving assembly to drive the transmission gear assembly 52 to rotate. The control circuit may be integrated on a circuit board, the circuit board may be a printed circuit board (Printed Circuit Board, PCB), and the control circuit may alternatively be integrated on a flexible printed circuit (Flexible Printed Circuit, FPC).

In addition, in the embodiments of this application, the driving assembly may include a driving member and a driving rod. The driving member is connected to the driving rod, a driving insection is provided on the driving rod, and the driving insection is engaged with the transmission gear assembly 52. In a case that the flexible screen 10 is driven to fold by the first housing 20 and the second housing 30, the driving member drives the driving rod to rotate along a first driving direction, to cause the driving rod to drive the transmission gear assembly 52 to rotate along the first direction; and in a case that the flexible screen 10 is driven to unfold by the first housing 20 and the second housing 30, the driving member drives the driving rod to rotate along a second driving direction, to cause the driving rod to drive the transmission gear assembly 52 to rotate along the second direction. The first driving direction and the second driving direction are reverse.

The driving member is connected to the driving rod, so that the driving member may drive the driving rod to rotate. The driving insection is provided on the driving rod, and the driving insection is engaged with the transmission gear assembly 52, so that when the driving rod rotates, the driving rod may drive the transmission gear assembly 52 to engage, so that the transmission gear assembly 52 drives the transmission rod 51 to rotate, and the transmission rod 51 further drives the stylus 40 to approach or move away from the flexible screen 10. For example, when the flexible screen 10 is driven to fold by the first housing 20 and the second housing 30, the driving member may drive the driving rod to rotate along the first driving direction, the driving rod drives the transmission gear assembly 52 to rotate along the first direction, and the transmission gear assembly 52 drives the transmission rod 51 to rotate along the first rotation direction, so that the stylus 40 approaches the flexible screen 10. When the flexible screen 10 is driven to unfold by the first housing 20 and the second housing 30, the driving member may drive the driving rod to rotate along the second driving direction, the driving rod drives the transmission gear assembly 52 to rotate along the second direction, and the transmission gear assembly 52 drives the transmission rod 51 to rotate along the second rotation direction, so that the stylus 40 moves away from the flexible screen 10.

It should be noted that, in the embodiments of this application, the driving member may be a motor.

In addition, in the embodiments of this application, when the transmission gear assembly 52 includes the driving gear 521 and the driven gear 522, the driving insection on the driving rod may be engaged with the driving gear 521. When the driving member drives the driving rod to rotate, the driving rod drives the driving gear 521 to rotate, the driving gear 521 drives the driven gear 522 to rotate, the driven gear 522 drives the transmission rod 51 to rotate, and the transmission rod 51 further drives the stylus 40 to move. In the embodiments of this application, after the driving rod rotates, the driving rod drives the driving gear 521 to rotate, and this is equivalent to using the principle of a worm wheel and a worm. In this case, the driving rod is equivalent to a worm, and the transmission gear assembly 52 is equivalent to a worm wheel. After the driven gear 522 rotates, the driven gear 522 drives the transmission rod 51 to rotate, and this is also equivalent to using the principle of a worm wheel and a worm. In this case, the driven gear 522 is equivalent to a worm wheel, and the transmission rod 51 is equivalent to a worm.

In addition, in the embodiments of this application, the driving assembly may include a driving member and a rack. The driving member is connected to the rack. An output shaft of the driving member may be connected to a lead screw nut structure, where the output shaft is connected to a lead screw, a nut is nested on the lead screw, and the nut is connected to the rack, so that the driving member is connected to the rack. In addition, the rack may be engaged with the driving gear 521. In a case that the flexible screen 10 is driven to fold by the first housing 20 and the second housing 30, the driving member drives, through the lead screw nut structure, the rack to move along a first moving direction, the rack drives the driving gear 521 to rotate along the first direction, the driving gear 521 drives the driven gear 522 to rotate, the driven gear 522 drives the transmission rod 51 to rotate along the first rotation direction, and the transmission rod 51 drives the stylus 40 to approach the flexible screen 10. In a case that the flexible screen 10 is driven to unfold by the first housing 20 and the second housing 30, the driving member drives, through the lead screw nut structure, the rack to move along a second moving direction, the rack drives the driving gear 521 to rotate along the second direction, the driving gear 521 drives the driven gear 522 to rotate, the driven gear 522 drives the transmission rod 51 to rotate along the second rotation direction, and the transmission rod 51 drives the stylus 40 to move away from the flexible screen 10. The first moving direction and the second moving direction are reverse.

In addition, in the embodiments of this application, a manner in which the transmission rod 51 is rotatably connected to the first housing 20 may be that: as shown in FIG.

4, a support 70 is arranged on the first housing 20, and the transmission rod 51 is rotatably connected to the support 70. That is, by arranging the support 70 on the first housing 20, the transmission rod 51 is rotatably connected to the support 70, so that the transmission rod 51 is rotatably connected to the first housing 20. In addition, by arranging the support 70, rotatable connection between the transmission rod 51 and the first housing 20 may be facilitated.

Figure 6:
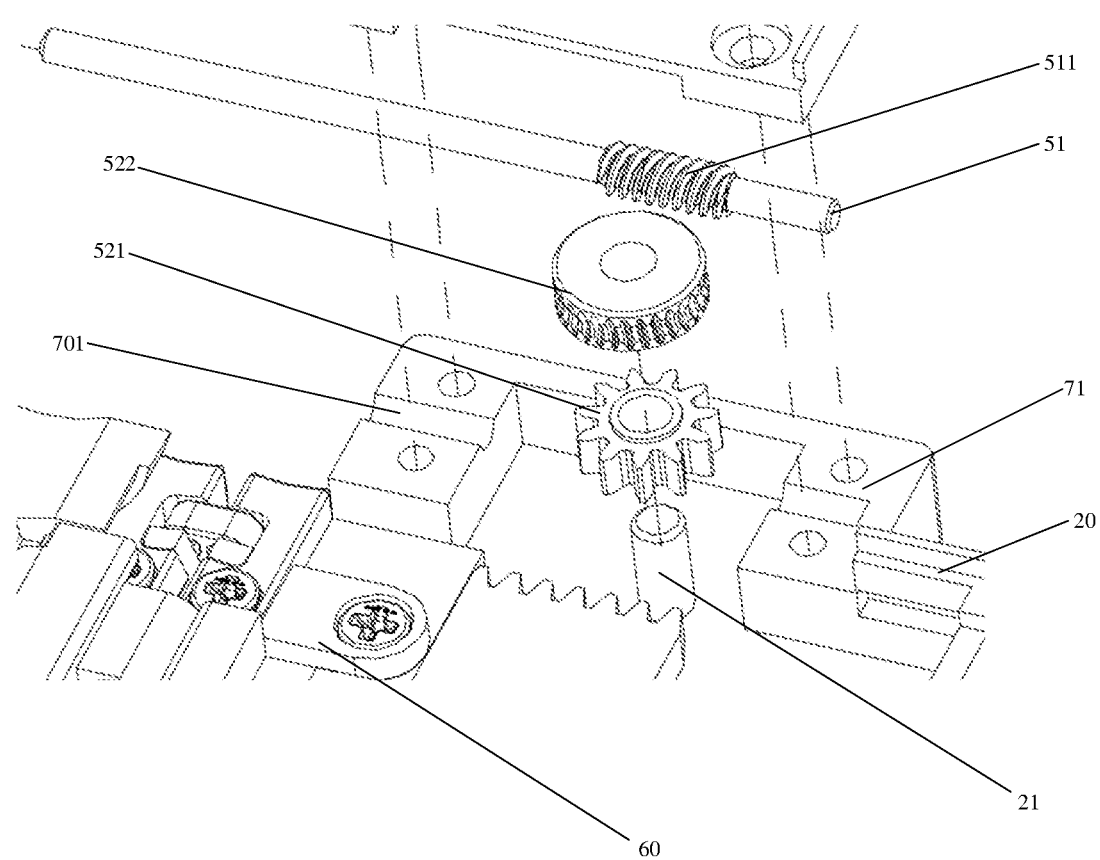
FIG. 6 is a second partial exploded view of an electronic device according to an embodiment of this application.
Figure 7:
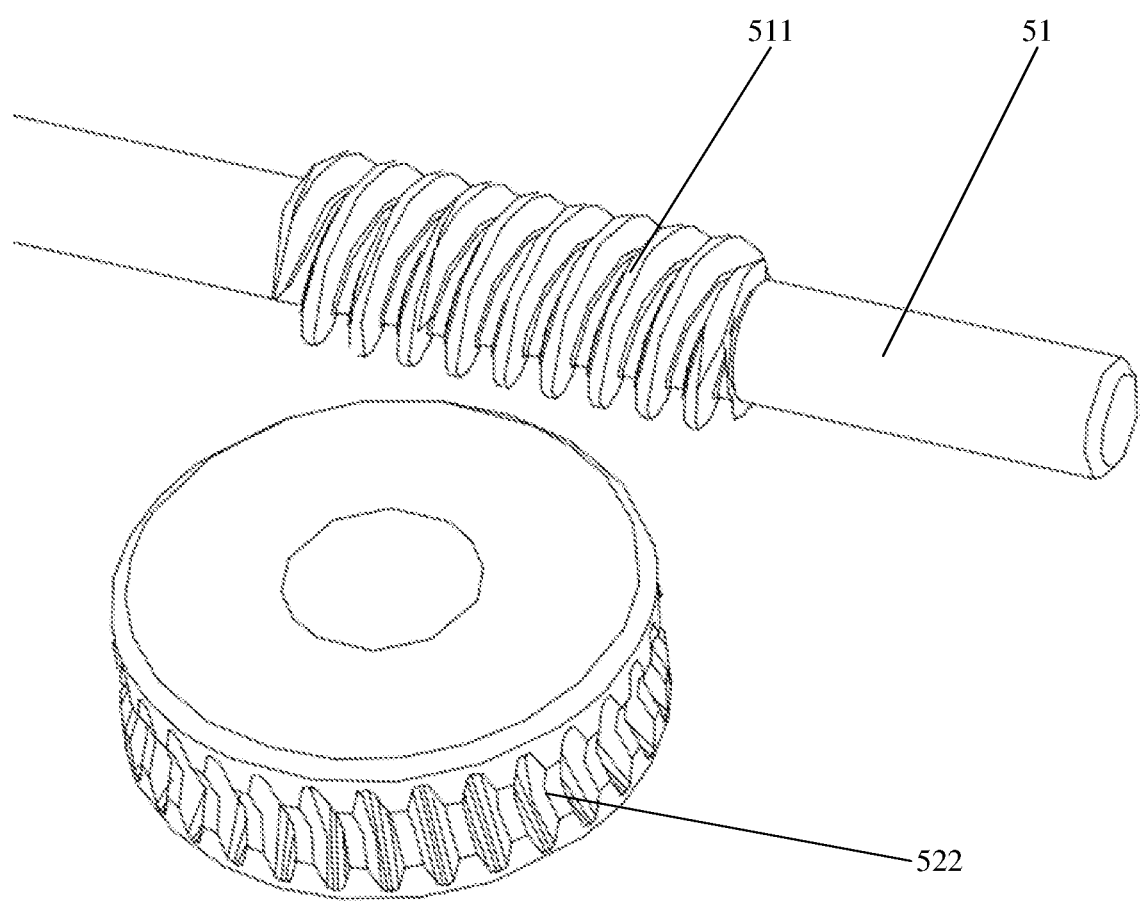
FIG. 7 is an exploded view of a transmission rod and a driven gear according to an embodiment of this application.

In addition, in some embodiments, a manner in which the transmission rod 51 is rotatably connected to the support 70 may be that: as shown in FIG. 4 and FIG. 6, a rotation groove 701 is provided on the support 70. At least a portion of the transmission rod 51 is located in the rotation groove 701, and the first transmission insection 511 is located in external space of the rotation groove 701.

The rotation groove 701 is provided on the support 70, and at least a portion of the transmission rod 51 is located in the rotation groove 701, so that the rotation groove 701 may perform a certain limiting function on the transmission rod 51, thereby preventing a problem that a position of the transmission rod 51 offsets in a rotation process. In addition, the transmission rod 51 may rotate in the rotation groove 701, so that the transmission rod 51 is rotatably connected to the support 70. That is, by providing the rotation groove 701 on the support 70, rotatable connection between the transmission rod 51 and the support 70 may be facilitated.

It should be noted that, a quantity of the rotation grooves 701 may be set according to an actual requirement. For example, the quantity of the rotation grooves 701 may be two or may be one, and the quantity of the rotation grooves 701 is not limited in the embodiments of this application.

In addition, in some embodiments, as shown in FIG. 4, the support 70 may include a fixing block 71 and a fixing plate 72, and the fixing plate 72 is detachably connected to the fixing block 71. The fixing block 71 is arranged on the first housing 20, the rotation groove 701 is provided on the fixing block 71, and the transmission rod 51 is located between the fixing block 71 and the fixing plate 72.

The support 70 includes the fixing block 71 and the fixing plate 72, the fixing block 71 is arranged on the first housing 20, and the rotation groove 701 is provided on the fixing block 71, so that at least a portion of the transmission rod 51 may be located in the rotation groove 701. The fixing plate 72 is detachably connected to the fixing block 71, so that after the fixing plate 72 is mounted on the fixing block 71, the transmission rod 51 may be located between the fixing plate 72 and the fixing block 71. Therefore, the fixing plate 72 and the rotation groove 701 perform a limiting function on the transmission rod 51 simultaneously, thereby preventing occurrence of a problem that the transmission rod 51 separates from the rotation groove 701 in a rotation process.

It should be noted that, the rotation groove 701 on the fixing block 71 may be provided according to an actual requirement. For example, the quantity of the rotation grooves 701 may be two. In this case, after the transmission rod 51 is mounted in the rotation groove 701, the first transmission insection 511 on the transmission rod 51 may be located between the two rotation grooves 701. Certainly, the quantity of the rotation grooves 701 may alternatively be one, and the quantity is not limited in the embodiments of this application.

In addition, in the embodiments of this application, the fixing plate 72 may be connected to the fixing block 71 through bolts, so that the fixing plate 72 is detachably connected to the fixing block 71. Certainly, the fixing plate 72 may alternatively be detachably connected to the fixing block 71 in a clamping manner, where a fastener may be arranged on the fixing plate 72, and a clamping groove may be provided on the fixing block 71. A manner in which the fixing plate 72 is detachably connected to the fixing block 71 is not limited in the embodiments of this application.

In addition, in some embodiments, a manner in which the stylus 40 is connected to the transmission rod 51 may be that: as shown in FIG. 4, the electronic device may further include a mounting base 80. The mounting base 80 is connected to the transmission rod 51, and the stylus 40 is detachably connected to the mounting base 80.

When the electronic device includes the mounting base 80, the mounting base 80 may be mounted on the transmission rod 51, to detachably connect the stylus 40 to the mounting base 80, so that the stylus 40 is connected to the transmission rod 51. That is, by arranging the mounting base 80, connection between the stylus 40 and the transmission rod 51 may be facilitated.

Certainly, the manner in which the stylus 40 is connected to the transmission rod 51 may alternatively be that: the stylus 40 is directly connected to the transmission rod 51. The stylus 40 may be connected to the transmission rod 51 in a clamping manner, that is, a clamping groove may be provided on the transmission rod 51, and a fastener may be arranged on the stylus, so that the stylus 40 is clamped to the transmission rod 51 through the fastener and the clamping groove.

In addition, in some embodiments, as shown in FIG. 4, a manner in which the stylus 40 is detachably connected to the mounting base 80 may be that: a mounting groove 81 is provided on the mounting base 80, a first magnetic member is arranged in the mounting groove 81, a second magnetic member is arranged on a mounting end of the stylus 40, the mounting end of the stylus 40 is located in the mounting groove 81, and magnetism of the first magnetic member and magnetism of the second magnetic member are opposite.

When the mounting groove 81 is provided on the mounting base 80, and the first magnetic member is arranged in the mounting groove 81, the second magnetic member may be arranged on the mounting end of the stylus 40. When the mounting end of the stylus 40 is mounted in the mounting groove 81, the first magnetic member may be attracted to the second magnetic member, thereby preventing the stylus 40 from falling from the mounting groove 81. When the stylus 40 needs to be taken out of the mounting groove 81, the user may take the stylus 40 out of the mounting groove 81.

Certainly, the stylus 40 may alternatively be detachably connected to the mounting base 80 in another manner. For example, a clamping groove is provided on the mounting base 80, a fastener is arranged on the stylus 40, and the fastener matches the clamping groove, so that the stylus 40 is detachably connected to the mounting base 80. The manner in which the stylus 40 is detachably connected to the mounting base 80 is not limited in the embodiments of this application.

It should be noted that, in the embodiments of this application, the electronic device includes but not limited to a mobile phone, a tablet computer, a notebook computer, a palmtop computer, an on-board terminal, a wearable device, and a pedometer.

In the embodiments of this application, the first housing 20 is movably connected to the second housing 30, and the flexible screen 10 is connected to the first housing 20 and the second housing 30, so that when the first housing 20 and the second housing 30 move relative to each other, the flexible screen 10 may be driven to fold or unfold by the first housing 20 and the second housing 30. The transmission structure 50 is arranged on the first housing 20, and the stylus 40 is connected to the transmission structure 50, so that the transmission structure 50 may transmit power to the stylus 40, to cause the stylus 40 to move. For example, when the flexible screen 10 is driven to fold by the first housing 20 and the second housing 30, the transmission structure 50 drives the stylus 40 to approach the flexible screen 10, to accommodate the stylus 40 in the gap formed after the flexible screen 10 is folded; and when the flexible screen 10 is driven to unfold by the first housing 20 and the second housing 30, the transmission structure 50 drives the stylus 40 to move away from the flexible screen 10, to cause the stylus 40 and the flexible screen 10 to form the preset included angle. That is, by arranging the transmission structure 50 and connecting the stylus 40 to the transmission structure 50, when the flexible screen 10 is folded, the stylus 40 may be accommodated in the gap formed after the flexible screen 10 is folded, and when the flexible screen 10 is unfolded, the stylus 40 and the flexible screen 10 form the preset included angle. This helps arrangement of the stylus 40 on the electronic device, also helps accommodation of the stylus 40, and helps use of the stylus 40 by a user to operate the electronic device when the flexible screen 10 is unfolded.

It should be noted that, the embodiments in this specification are all described in a progressive manner. Each embodiment focuses on differences from other embodiments, and reference may be made to each other for the same or similar parts among the embodiments.

Although optional embodiments of the embodiments of this application have been described, a person skilled in the art may make other changes and modifications to the embodiments once learning a basic creative concept. Therefore, the appended claims are intended to cover the optional embodiments and all changes and modifications falling within the scope of the embodiments of this application.

Finally, it should be further noted that, the relational terms in this specification such as first and second are used only to differentiate an entity from another entity, and do not require or imply any actual relationship or sequence between the entities. In addition, the terms "include", "comprise", and any variants thereof are intended to cover non-exclusive inclusion. Therefore, an object or a terminal device that includes a series of elements not only includes such elements, but also includes other elements that are not expressly listed, or may further include elements inherent to the object or the terminal device. Without more limitations, an element limited by the sentence "include a/an . . . " does not exclude other same elements existing in the object or the terminal device that includes the element.

The technical solutions of this application are described above in detail. The principle and implementations of this application are described by using specific examples in this specification. Meanwhile, a person of ordinary skill in the art may make modifications to the specific implementations and application ranges according to the principle and implementations of this application. In conclusion, the content of this specification should not be construed as a limitation on this application.

What is claimed is:

1. An electronic device, comprising: a flexible screen, a first housing, a second housing, a stylus, and a transmission structure, wherein
the first housing is movably connected to the second housing, the flexible screen is connected to the first housing and the second housing, the transmission structure is arranged on the first housing, and the stylus is connected to the transmission structure;
in a case that the flexible screen is driven to fold by the first housing and the second housing, the first housing drives the transmission structure to move, and the transmission structure drives the stylus to approach the flexible screen, to accommodate the stylus in a gap formed after the flexible screen is folded; and
in a case that the flexible screen is driven to unfold by the first housing and the second housing, the first housing drives the transmission structure to move, and the transmission structure drives the stylus to move away from the flexible screen, to cause the stylus and the flexible screen to form a preset included angle.

2. The electronic device according to claim 1, wherein the transmission structure comprises a transmission rod and a transmission gear assembly;
the transmission gear assembly is rotatably connected to the first housing, a first transmission insection is provided on the transmission rod, the transmission gear assembly is engaged with the first transmission insection, and the transmission rod is connected to the stylus;
in a case that the flexible screen is driven to fold by the first housing and the second housing, the transmission gear assembly rotates along a first direction to cause the transmission rod to rotate along a first rotation direction, and the transmission rod drives the stylus to approach the flexible screen; and
in a case that the flexible screen is driven to unfold by the first housing and the second housing, the transmission gear assembly rotates along a second direction to cause the transmission rod to rotate along a second rotation direction, and the transmission rod drives the stylus to move away from the flexible screen, wherein
the first direction and the second direction are reverse, and the first rotation direction and the second rotation direction are reverse.

3. The electronic device according to claim 2, wherein the first housing is connected to the second housing through a hinge component;
the hinge component is connected to the transmission gear assembly;
in a case that the flexible screen is driven to fold by the first housing and the second housing, the hinge component drives the transmission gear assembly to rotate along the first direction; and
in a case that the flexible screen is driven to unfold by the first housing and the second housing, the hinge component drives the transmission gear assembly to rotate along the second direction.

4. The electronic device according to claim 3, wherein the hinge component is connected to a sliding block, a second transmission insection is provided on the second sliding block, and the second transmission insection is engaged with the transmission gear assembly;
in a case that the flexible screen is driven to fold by the first housing and the second housing, the hinge component drives the sliding block to slide along a first sliding direction, to cause the sliding block to drive the transmission gear assembly to rotate along the first direction; and
in a case that the flexible screen is driven to unfold by the first housing and the second housing, the hinge component drives the sliding block to slide along a second sliding direction, to cause the sliding block to drive the transmission gear assembly to rotate along the second direction, wherein
the first sliding direction and the second sliding direction are reverse.

5. The electronic device according to claim 2, wherein a driving assembly is arranged in the first housing;
the driving assembly is connected to the transmission gear assembly;
in a case that the flexible screen is driven to fold by the first housing and the second housing, the driving assembly drives the transmission gear assembly to rotate along the first direction; and
in a case that the flexible screen is driven to unfold by the first housing and the second housing, the driving assembly drives the transmission gear assembly to rotate along the second direction.

6. The electronic device according to claim 5, wherein the driving assembly comprises a driving member and a driving rod;
the driving member is connected to the driving rod, a driving insection is provided on the driving rod, and the driving insection is engaged with the transmission gear assembly;
in a case that the flexible screen is driven to fold by the first housing and the second housing, the driving member drives the driving rod to rotate along a first driving direction, to cause the driving rod to drive the transmission gear assembly to rotate along the first direction; and
in a case that the flexible screen is driven to unfold by the first housing and the second housing, the driving member drives the driving rod to rotate along a second driving direction, to cause the driving rod to drive the transmission gear assembly to rotate along the second direction, wherein
the first driving direction and the second driving direction are reverse.

7. The electronic device according to claim 2, wherein a support is arranged on the first housing, and the transmission rod is rotatably connected to the support;
a rotation groove is provided on the support; and at least a portion of the transmission rod is located in the rotation groove, and the first transmission insection is located in external space of the rotation groove.

8. The electronic device according to claim 7, wherein the support comprises a fixing block and a fixing plate, and the fixing plate is detachably connected to the fixing block; and
the fixing block is arranged on the first housing, the rotation groove is provided on the fixing block, and the transmission rod is located between the fixing block and the fixing plate.

9. The electronic device according to claim 2, wherein the electronic device further comprises a mounting base; and
the mounting base is connected to the transmission rod, and the stylus is detachably connected to the mounting base.

10. The electronic device according to claim 9, wherein a mounting groove is provided on the mounting base, a first magnetic member is arranged in the mounting groove, a second magnetic member is arranged on a mounting end of the stylus, the mounting end of the stylus is located in the mounting groove, and magnetism of the first magnetic member and magnetism of the second magnetic member are opposite.

11. The electronic device according to claim 2, wherein the transmission gear assembly comprises a driving gear and a driven gear; and
a rotation shaft is arranged on the first housing, the driving gear and the driven gear are both sleeved on the rotation shaft, the driving gear is connected to the driven gear, and the driven gear is engaged with the first transmission insection.

* * * * *